United States Patent
MacFaden et al.

(10) Patent No.: US 7,366,174 B2
(45) Date of Patent: Apr. 29, 2008

(54) ADAPTIVE CLASSIFICATION OF NETWORK TRAFFIC

(75) Inventors: Michael R. MacFaden, San Jose, CA (US); Paul Calato, Amherst, NH (US)

(73) Assignee: Lucent Technologies Inc., Murray Hill, NJ (US)

( * ) Notice: Subject to any disclaimer, the term of this patent is extended or adjusted under 35 U.S.C. 154(b) by 805 days.

(21) Appl. No.: 10/321,924

(22) Filed: Dec. 17, 2002

(65) Prior Publication Data

US 2004/0114518 A1 Jun. 17, 2004

(51) Int. Cl.
*H04L 12/28* (2006.01)
*H04J 1/16* (2006.01)

(52) U.S. Cl. ............... 370/392; 370/230; 370/235

(58) Field of Classification Search ........... 370/230.1, 370/235–238; 709/203, 225, 230
See application file for complete search history.

(56) References Cited

U.S. PATENT DOCUMENTS

| | | | | |
|---|---|---|---|---|
| 5,991,292 A | | 11/1999 | Focsaneanu et al. | |
| 6,023,456 A | * | 2/2000 | Chapman et al. | 370/252 |
| 6,078,953 A | * | 6/2000 | Vaid et al. | 709/223 |
| 6,104,700 A | * | 8/2000 | Haddock et al. | 370/235 |
| 6,137,777 A | * | 10/2000 | Vaid et al. | 370/230 |
| 6,167,445 A | * | 12/2000 | Gai et al. | 709/223 |
| 6,401,117 B1 | | 6/2002 | Narad et al. | 709/223 |
| 6,412,000 B1 | * | 6/2002 | Riddle et al. | 709/224 |
| 6,466,984 B1 | * | 10/2002 | Naveh et al. | 709/228 |
| 6,529,475 B1 | * | 3/2003 | Wan et al. | 370/231 |
| 6,542,466 B1 | * | 4/2003 | Pashtan et al. | 370/235 |
| 6,594,268 B1 | * | 7/2003 | Aukia et al. | 370/400 |
| 6,636,481 B1 | * | 10/2003 | Yamaguchi et al. | 370/230 |
| 6,732,168 B1 | * | 5/2004 | Bearden et al. | 709/223 |
| 6,748,433 B1 | * | 6/2004 | Yaakov | 709/224 |
| 6,768,716 B1 | * | 7/2004 | Abel et al. | 370/230 |
| 6,917,588 B1 | * | 7/2005 | Cao et al. | 370/230.1 |
| 6,973,034 B1 | * | 12/2005 | Natarajan et al. | 370/232 |
| 2001/0052011 A1 | | 12/2001 | Nagao | |
| 2002/0040396 A1 | * | 4/2002 | Yoshihara et al. | 709/225 |
| 2002/0087393 A1 | * | 7/2002 | Philonenko | 705/11 |
| 2002/0107908 A1 | * | 8/2002 | Dharanikota | 709/203 |
| 2002/0120720 A1 | * | 8/2002 | Moir | 709/220 |
| 2002/0122422 A1 | * | 9/2002 | Kenney et al. | 370/392 |
| 2002/0188720 A1 | * | 12/2002 | Terrell et al. | 709/225 |
| 2002/0194317 A1 | * | 12/2002 | Kanada et al. | 709/223 |
| 2002/0194369 A1 | * | 12/2002 | Rawlins et al. | 709/238 |
| 2003/0012147 A1 | * | 1/2003 | Buckman et al. | 370/260 |
| 2003/0055920 A1 | * | 3/2003 | Kakadia et al. | 709/220 |
| 2003/0142681 A1 | * | 7/2003 | Chen et al. | 370/401 |

FOREIGN PATENT DOCUMENTS

WO WO 00/72516 A1 11/2000

OTHER PUBLICATIONS

RFC 2475, An Architecture for Differentiated Services, Network Working Group, Dec. 1998.

* cited by examiner

*Primary Examiner*—Huy D. Vu
*Assistant Examiner*—Clemence Han

(57) ABSTRACT

Rules for classifying traffic in a communications network are set by collecting traffic data related to traffic that is input into a network node, processing the traffic data that is collected, and setting classification rules in response to the processed traffic data, wherein the set classification rules are used to classify subsequent input traffic. In an embodiment, subsequent traffic is classified according to the set classification rules. In another embodiment, traffic conditioning rules are also set in response to the processed traffic data and subsequent input traffic is conditioned according to the set traffic conditioning rules.

8 Claims, 10 Drawing Sheets

ADAPTIVE CLASSIFICATION OF NETWORK TRAFFIC

FIELD OF THE INVENTION

The invention relates to traffic management in a communications network, and more particularly to the classification of network traffic into various traffic classes.

BACKGROUND OF THE INVENTION

Large communications networks, such as subscriber-based access networks, connect many end-users (i.e., from hundreds of thousands to millions) to the Internet through various intermediate network nodes. FIG. 1 depicts an example of a subscriber-based network 100 in which end-users are connected to the Internet 102 through a combination of customer premises equipment (CPE) 104, intermediate network nodes 106, and a metropolitan area network (MAN) 108. The MAN includes a series of service provider edge devices 110 that are connected in a ring around the metropolitan area. The CPE for each end-user provides the interface between various end-user devices, such as computers, telephones, and televisions and the intermediate network nodes. The CPE may include a modem, such as a cable modem, a digital subscriber line (DSL) modem, or a dial-up modem. The intermediate network nodes provide aggregation and traffic management functions between the CPE and the service provider edge devices. The service provider edge devices provide further aggregation and traffic management functions on the traffic that is received from the intermediate network nodes.

In order to provide the end-users with an acceptable level of service within a given domain and with bounded resources when accessing the Internet 102, it is important to be able to control the traffic flow to and from the end-users at different points within the network. One technique for controlling the flow of traffic in the network is to assign static bandwidth limits to each end-user. For example, each end-user can be assigned a certain specified bandwidth limit, which cannot be exceeded at any time. By controlling the bandwidth of each end-user such that each end-user is guaranteed a minimum service level, a network manager can design a network for known peak traffic conditions. Although assigning static bandwidth limits to each end-user works well to control the flow of traffic in a network and to guarantee minimum service levels, the static bandwidth limits do not take into consideration the fact that different traffic types have different bandwidth needs. That is, some traffic, such as voice traffic, may be delay sensitive and require relatively small amounts of bandwidth while other traffic, such as large file downloads, may not be degraded by delay but may require relatively large amounts of bandwidth. In addition, assigning static bandwidth limits to guarantee minimum service levels can cause bandwidth demand of some users to go unsatisfied because bandwidth resources are being reserved to ensure the guaranteed minimum service levels to other end-users.

One technique for controlling the flow of traffic to meet specified bandwidth needs for different types of traffic is known as Differentiated Services (Diffserv). An example of a DiffServ architecture is described in the document entitled, "An Architecture for Differentiated Services," (IETF Request for Comment (RFC) 2475, December 1998). Referring to FIG. 2, the DiffServ architecture 214 described in RFC 2475 includes a classifier 216 and a traffic conditioner module 218, with the traffic conditioner module including a meter 220, a marker 222, and a shaper/dropper 224. The classifier identifies packets based on the content of packet headers according to defined classification rules. The meter measures the temporal properties (i.e., rate) of traffic streams that are identified by the classifier and the results of the measuring are used to affect the operation of the marker or the shaper/dropper. The marker sets the DiffServ codepoint in a packet header based on defined rules and the shaper/dropper can delay packets within a traffic stream to cause the stream to conform to a defined traffic profile or discard packets that are found to be outside of a defined traffic profile. As depicted in FIG. 2, the marker and shaper/dropper operate in response to information from the meter and the meter operates in response to information from the classifier.

In a large subscriber network, such as the subscriber-based access network described with reference to FIG. 1, DiffServ functions are often installed in the intermediate network nodes 106. For example, the intermediate network nodes include classifiers 116 and traffic conditioner modules 118, as depicted in FIG. 1, for controlling the flow of traffic at the outputs of the intermediate network nodes. In order to control the flow of traffic at the outputs of the intermediate network nodes, classification rules that identify criteria for classifying incoming traffic and conditioner rules that control the flow rate of the classified traffic are set. Typically, the classification and conditioning rules are installed with the same static settings throughout the network at the time that the DiffServ features are initiated. Although this "set and forget" approach may work well for controlling the flow of traffic at the time that the DiffServ features are initiated, traffic patterns of end-users tend to change over time. For example, new applications that were previously unknown to the network manager may become popular after the classification and conditioning rules are installed.

Changes in the traffic patterns of end-users may cause the performance (i.e., as measured by overall throughput) of the network to degrade. Performance degradation may result because conditioning rules are not appropriate for the new traffic patterns. While the conditioning rules in a large subscriber-based network are typically static, there are known techniques for dynamically adjusting the conditioning rules to account for changes in traffic patterns. Although dynamically adjusting conditioning rules is possible, traffic conditioners act on the traffic as it is classified. In known subscriber-based DiffServ networks, the "set and forget" nature of the classifiers does not provide a mechanism to enable the classification rules to be adapted to the changing nature of the traffic. If the static classification rules do not adequately classify the new traffic patterns, then the effectiveness of dynamically adjusting conditioning rules to account for changes in traffic patterns is limited. For example, if a new application is included in a traffic class with other applications, it is impossible to individually control the new application with a conditioning rule that is specific to the new application unless the new application can be individually identified. In addition, trying to control the new application that is included in a traffic class with other known applications without individually classifying the application may have adverse implications on the other known applications.

As described above, the task of adapting classification and conditioning rules for a single DiffServ instance can be cumbersome. In a subscriber-based network with hundreds of thousands to millions of end-users, the task of adapting DiffServ instances is enormous. One example of a DiffServ architecture that can be adapted to a large network is described in the published International patent application entitled "Communication Network Method and Apparatus," (WO 00/72516 A1, published 30 Nov. 1998). The patent application discloses a centralized network system for setting and distributing conditioning rules among multiple DiffServ instances. Although the centralized setting and distributing of conditioning rules works well, as indicated above, the effectiveness of adapting conditioning rules depends on the classification of the traffic. The effectiveness of adapting conditioning rules degrades as traffic patterns change if the classification rules are not adapted to the changing traffic patterns.

In view of the need to control the flow of traffic in networks, such as large scale subscriber-based networks, and in view of the changing nature of end-user traffic patterns, what is needed is a technique for adapting the classification of network traffic to account for changing traffic patterns that can be implemented in a DiffServ environment and that can be scaled for use in a large subscriber-based network.

SUMMARY OF THE INVENTION

Rules for classifying traffic in a communications network are set by collecting traffic data related to traffic that is input into a network node, processing the traffic data that is collected, and setting classification rules in response to the processed traffic data, wherein the set classification rules are used to classify subsequent input traffic. In an embodiment, subsequent traffic is classified according to the set classification rules. In another embodiment, traffic conditioning rules are also set in response to the processed traffic data and subsequent input traffic is conditioned according to the set traffic conditioning rules.

In another embodiment, classification rules are set for multiple classifiers that are distributed among multiple network nodes in a communications network. The classification rules are set by collecting traffic data from traffic that is input into the network nodes, communicating the traffic data that is collected to a common classification control module, processing, at the common classification control module, the traffic data that is collected, and setting classification rules in response to the processed traffic data, wherein the set classification rules are used to classify subsequent input traffic. In an embodiment, the set classification rules are distributed to the classifiers so that subsequent traffic can be classified according to the set classification rules.

Other aspects and advantages of the present invention will become apparent from the following detailed description, taken in conjunction with the accompanying drawings, illustrating by way of example the principles of the invention.

DETAILED DESCRIPTION OF THE INVENTION

Rules for classifying traffic in a communications network are set by collecting traffic data related to traffic that is input into a network node, processing the traffic data that is collected, and setting classification rules in response to the processed traffic data, wherein the set classification rules are used to classify subsequent input traffic. In an embodiment, subsequent traffic is classified according to the set classification rules. In another embodiment, traffic conditioning rules are also set in response to the processed traffic data and subsequent input traffic is conditioned according to the set traffic conditioning rules.

Figure 3:
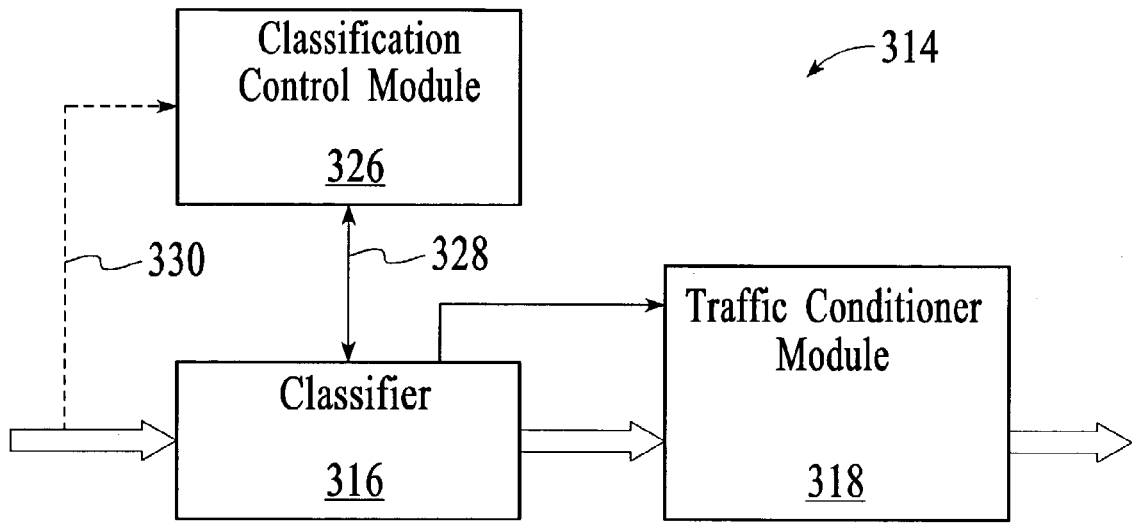
FIG. 3 depicts a traffic control architecture in accordance with an embodiment of the invention that includes a classifier, a traffic conditioner module, and a classification control module in which the classifier is adapted in response to classification rules provided by the classification control module.

FIG. 3 depicts a traffic control architecture 314 that includes a classifier 316, a traffic conditioner module 318, and a classification control module 326 in which the classifier is adapted in response to classification rules provided by the classification control module. In the embodiment of FIG. 3, the classifier and traffic conditioner modules perform functions similar to those described in RFC 2475, which is incorporated by reference herein. Throughout the description, similar reference numbers may be used to identify similar elements.

The classifier 316 classifies packets based on the content of packet headers according to defined classification rules. In an embodiment, the classifier reads the header information of incoming packets and applies the classification rules to the header information. Header fields of interest in classifying packets include fields at layer 2 and above, where the layers are defined by the International Standards Organization (ISO) in the Open System Interconnect (OSI) model. Particular fields of interest that may be used to classify packets include layer 3 fields such as source IP address, destination IP address, protocol (i.e., TCP, UDP), Type of Service (TOS) and layer 4 fields such as source and destination port (which identify higher layer applications such as HTTP, FTP, RTP, and Gopher).

Figure 2:
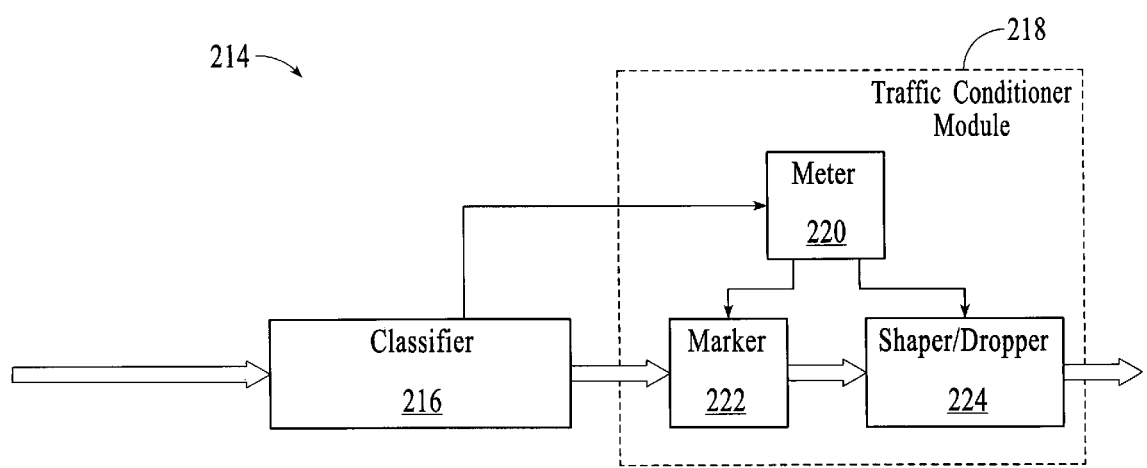
FIG. 2 a DiffServ architecture, as described in RFC 2475, that includes a classifier and a traffic conditioner, with the traffic conditioner including a meter, a marker, and a shaper/dropper.

The traffic conditioner module 318 controls the flow of classified traffic to conform to certain traffic conditioning rules. The traffic conditioner module may include a meter, a marker, and/or a shaper/dropper as described above with reference to FIG. 2. The meter measures the temporal properties (i.e., rate) of traffic streams that are identified by the classifier and the results of the measuring are used to affect the operation of the marker and/or the shaper/dropper. The marker sets a codepoint in packet headers (i.e., a DiffServ codepoint) based on defined rules. The shaper/dropper can delay packets within a traffic stream to cause the stream to conform to a defined traffic profile or discard packets that are found to be outside of a defined traffic profile. As depicted in FIG. 2, the marker 222 and shaper/dropper 224 operate in response to information from the meter 220 and the meter operates in response to information from the classifier. It should be noted that each instance of the traffic conditioner module 318 does not necessarily include a meter, a marker, and a shaper/dropper. For example, in the case where no traffic conditioning rules are in effect, the traffic conditioner module may include only a classifier and a marker. In addition, some metering functions may be performed by the classifier. That is, the classifier may classify traffic and measure temporal properties of the classified traffic streams.

Throughout the description, the combination of the classifier 316 and the traffic conditioning module 318 is referred to generally as an "instance," and more particularly as a "DiffServ instance." In an embodiment, DiffServ instances are applied to physical ports on a per-port basis at each port where traffic control is desired. In an embodiment, the DiffServ instance described with reference to FIG. 3 is located in a DiffServ domain, where a DiffServ domain is formed by a contiguous set of DiffServ instances which operate with a common set of service provisioning policies and per-hop-behavior definitions.

Referring to FIG. 3, in accordance with an embodiment of the invention, the classification control module 326 collects traffic data from incoming traffic, processes the collected traffic data, and sets classification rules in response to the processed traffic data. The classification rules are provided to the classifier 316, as indicated by communications path 328, and used by the classifier to classify subsequent incoming traffic. In an embodiment, the classification control module obtains traffic data from the classifier as indicated by communications path 328. In an embodiment, the classifier performs some traffic metering functions and the resulting traffic data is provided to the classification control module. In another embodiment, traffic data is obtained from the meter within the traffic conditioning module 318. Traffic data obtained from the classifier has typically already been classified according to the current classification rules unless no classification rules have been installed into the classifier (i.e., at classifier initiation). The classification control module may obtain unclassified traffic data directly from the incoming traffic stream as indicated by communications path 330. Traffic data can be obtained directly from the incoming traffic stream using, for example, a probe. In one implementation, the elements of the traffic control architecture are embodied in software, however, other implementations may include a combination of software and hardware.

Figure 4:
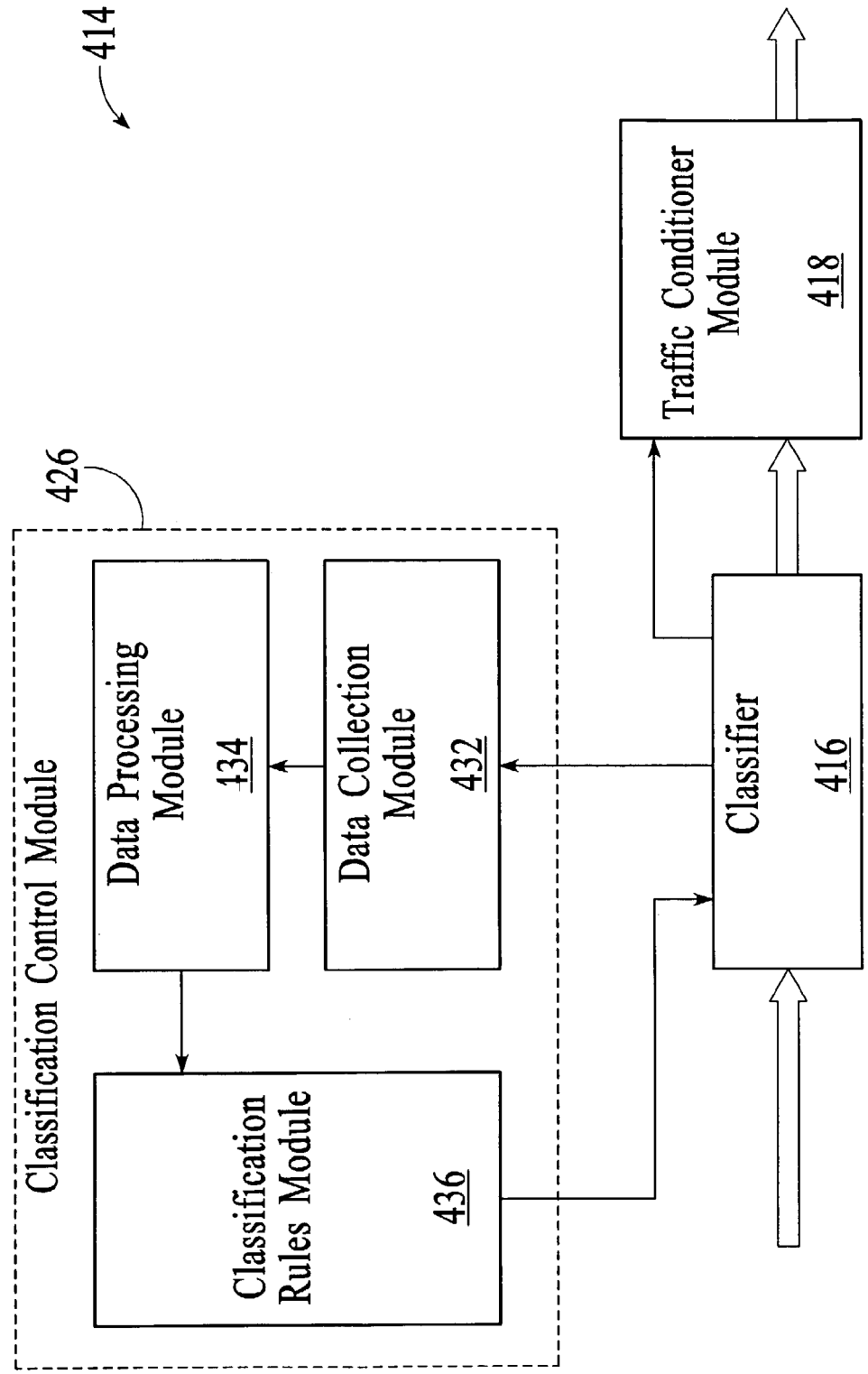
FIG. 4 depicts a traffic control architecture that is similar to FIG. 3 in which the classification control module includes a data collection module, a data processing module, and classification rules module in accordance with an embodiment of the invention.

FIG. 4 depicts a traffic control architecture 414 with an expanded view of an embodiment of a classification control module 420. In the embodiment of FIG. 4, the classification control module includes a data collection module 432, a data processing module 434, and a classification rules module 436. In the embodiment of FIG. 4, the data collection module obtains traffic data from the classifier 416 and performs data collection functions. The data processing module performs data processing functions using traffic data from the data collection module. The data processing module provides processed information to the classification rules module. The classification rules module uses the processed information from the data processing module to generate classification rules. The classification rules are provided to the classifier and used by the classifier to classify subsequent traffic. The classification rules may include new classification rules and/or modifications of existing rules. In an alternative embodiment, the data collection module obtains traffic data from a source other than the classifier as described with reference to FIG. 3. The traffic control architecture depicted and described herein enables the classification rules to be intelligently adapted in response to current traffic characteristics. The data collection module, the data processing module, and the classification rules module are described in detail below followed by a description of traffic control architectures that are applied to multiple ports and multiple network nodes.

Referring to FIG. 4, the data collection module 432 collects traffic data that is obtained from the classifier 416 or from another source. The data collection module may collect traffic data for multiple different traffic parameters. In an embodiment, the data collection module collects traffic data, such as traffic volume data, for the traffic classes that are identified by the classifier. For example, the data collection module may accumulate byte counts and/or packet counts, on a per-class basis, for each different traffic class that is identified by the classifier. In an embodiment, the data collection module performs functions similar to a meter (i.e., as defined in RFC 2475) and in some instances, the two elements may be integrated. In an embodiment, counters are used to collect traffic data in the form of byte counts and/or packet counts. Counters can be established for any of the desired traffic parameters. The byte counts can easily be converted into rate information by including the time period over which the bytes are accumulated. The data collection module may collect other traffic data such as; the source and/or destination IP address of the traffic, the protocol of the traffic, the type of service of the traffic, the source and/or destination port of the traffic, the Autonomous System (AS) number of the traffic, label switch paths (LSPs), route prefixes, input port identifiers, per service level agreement (SLA) data, or any other data that can be gleaned from the traffic. Additional traffic data may include temporal characteristics of the traffic. For example, information related to the time of day and/or day of the week of traffic may be collected.

In an embodiment, the data collection module 432 collects traffic data at the network node that includes the classifier 416. In other embodiments the traffic data is collected at a remote network node, for example, a network node that collects traffic data for multiple network nodes. The detail needed for subsequent traffic data processing may dictate how and where traffic data is collected. For example, a queue that is used by the network node to process incoming traffic is probably known only by the network node and therefore the collection of traffic data locally at the network node may be the most efficient way to collect traffic data. The data that is collected by the data collection module is stored for use by the data processing module 434 and may be transmitted, as needed, for remote processing.

Figure 5:
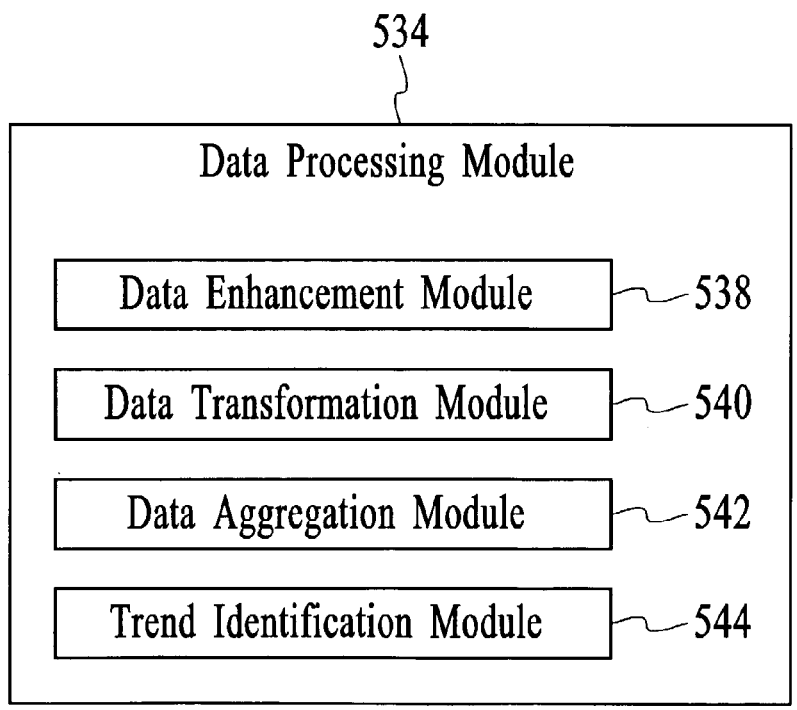
FIG. 5 depicts an expanded view of an embodiment of a data processing module in accordance with an embodiment of the invention that includes a data enhancement module for enhancing traffic data, a data transformation module for transforming traffic data, a data aggregation module for aggregating traffic data, and a trend identification module for identifying trends from the traffic data.

The data processing module 434 processes the traffic data that is collected by the data collection module 432. Data processing functions performed by the data processing module may include, for example, data enhancement, data transformation, data aggregation, and trend identification. FIG. 5 depicts an expanded view of an embodiment of a data processing module 534 that includes a data enhancement module 538 for enhancing traffic data, a data transformation module 540 for transforming traffic data, a data aggregation module 542 for aggregating traffic data, and a trend identification module 544 for identifying trends from the traffic data. In an embodiment, the data processing module is located within the network node that includes the data collection module, the classifier, and the traffic conditioner module. In another embodiment, the data processing module is located in a network node that is remote to the data collection module, the classifier, and the traffic conditioner module. Alternatively, some elements of the data processing module may be located locally within the same network node as the data collection module, the classifier, and the traffic conditioner module while others are remotely located.

Referring to FIG. 5, the data enhancement module 538 adds additional detail to the traffic data that is collected by the data collection module. In an embodiment, enhanced traffic data is derived from the traffic data that is collected by the data collection module. In another embodiment, information is obtained from listening to or participating in network protocols such as BGP, OSPF, RIP. The information may be used, for example, to learn additional traffic related information such as the Autonomous System number for various IP prefixes. In another example, the IP address of a packet may be looked up in a customer database and a Customer ID may be added to the recorded information. The enhanced traffic data is stored for use in subsequent processing and/or for establishing classification rules. Data enhancement can occur at any point after data collection. Traffic data may be enhanced before or after it is transformed and/or aggregated.

The data transformation module 540 modifies the traffic data. Typically, the traffic data is modified to some form that is advantageous for further processing, such as aggregation and/or trend analysis. Examples of data transformation include converting individual IP addresses into IP prefixes, port to service SMTP traffic type, BCST, MCST. Data transformation may occur at any point after data collection and may occur more than once on the same data element. For example, an IP address may initially be converted into a prefix with a Classes Internet Domain Routing (CIDR) netmask of twenty-four and later converted into a prefix with a CIDR netmask of sixteen.

The data aggregation module 542 aggregates the traffic data according to specified aggregation rules. Data aggregation enables traffic data to be summarized based on a specific set of parameters. Any of the traffic data, including enhanced and transformed data, can be aggregated. In an embodiment, any of the recorded fields, namely raw data fields, fields added by data enhancement, or transformed data fields may be chosen as part of the aggregation rule. Any fields not part of the aggregation rule which are not common to all records summarized in the aggregated traffic data should be omitted. For example, if the aggregation rule specifies the source and destination IP address fields, then the source and destination port fields must be omitted if all raw data records summarized in the aggregated traffic data do not share the same source and destination port values. However, since the source AS number is derived from the source IP address, the source AS field may stay within the aggregated traffic data. The byte and packets fields of the collected traffic data can be summed to get the value for the aggregated traffic data. Aggregation functions other than summing may be applied to the collected traffic data to arrive at the values for the aggregated traffic data, as long as a field is added to the record to indicate what function was used. Different aggregation rules may be applied to the same set of collected traffic data to produce a different set of aggregated traffic data. Aggregated traffic data records may also be aggregated. The process of aggregation may continue until only one aggregated data record is left. Aggregated traffic data records may also be enhanced and/or transformed by the enhancement and/or data transformation modules. Additionally, fields of no interest may be dropped from an aggregated traffic data record.

The trend identification module 544 uses the traffic data to identify traffic trends (also referred to as traffic patterns) that may be used in establishing classification rules. The trend identification module may use any form of traffic data, for example, unprocessed traffic data, enhanced traffic data, transformed traffic data, aggregated traffic data, or any combination thereof to identify particular traffic trends. Traffic trends may be identified based on a snapshot of all data available at some point in time, for example, the IP address that has received or transmitted the greatest number of packets. Traffic trends may also be identified based on data over a given period of time, for example, the IP address that has received or transmitted the greatest number of packets over the last hour, week, month, or year. Identifying traffic trends may also involve traffic comparisons between one or more different time periods, for example, given the top IP address from the last hour, determine if the usage is going up or down over the next two hours. Identified traffic trends can be used by the classification rules module to set classification rules that identify traffic classes of interest. For example, classification rules can be established to identify the top IP address where the usage pattern has increased by more than fifty percent during each of the last two time periods.

Referring back to FIG. 4, the classification rules module 436 uses the traffic data from the data processing module 434 to set classification rules for the classifier 416. The classification rules module may use any form of traffic data to set classification rules. For example, the classification rules module may use enhanced traffic data, transformed traffic data, aggregated traffic data, identified trends, or any combination thereof to set classification rules. The classification rules module may also use unprocessed traffic data that is collected by the data collection module 432 alone or in combination with any other traffic data to set classification rules. In an embodiment, the classification rules set by the classification rules module are dynamically adjusted in response to new traffic data from the data processing module. That is, the classification rules are adapted in response to changes in the traffic data and/or identified traffic trends. For example, the classification rules module may set classification rules that identify more appropriate traffic classes in response to current traffic trends. The dynamic adjustment of classification rules can in turn enable more effective traffic conditioning. For example, specific traffic flows that are identified through dynamic adjustments of the classification rules can be controlled by installing traffic conditioning rules that target the specific traffic flows. Specifically, classification rules can be adapted to identify particular applications in a traffic stream so that the particular applications can be monitored and, if necessary, conditioned. For example, an end-user that is generating email traffic and file transfer protocol (FTP) traffic can have the FTP traffic rate limited while the email traffic is left alone.

In an embodiment, the dynamic adjustment of classification rules is a continuous process in which data collection, data processing, and setting new classification rules is repeated in designated intervals. For example, classification rules may be adjusted at a regular time interval or at a regular traffic volume interval (i.e., after a specified volume of traffic has been received). Adjustments in traffic classification rules can lead to changes in traffic conditioning rules, which in turn can lead to changes in the nature of the traffic that is input to the classifier.

In an embodiment, the classification control module 426 is managed by a network operator through an application programming interface (API). For example, the logic involved with data collection, data processing, and classification rules setting are installed and modified through an API.

Figure 6:
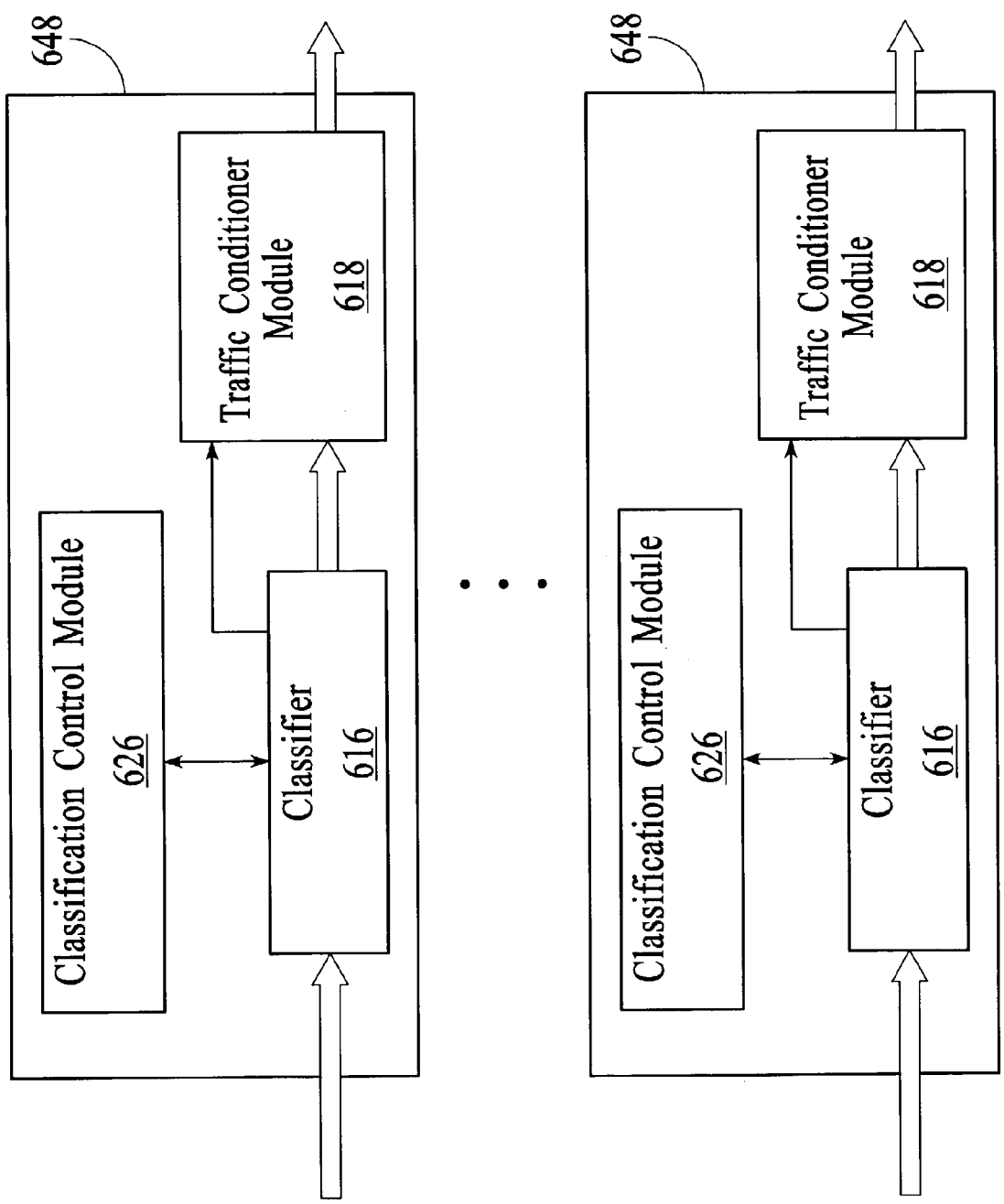
FIG. 6 depicts an example of a traffic control architecture that includes multiple DiffServ instances, with classification control modules, that are implemented in parallel in accordance with an embodiment of the invention.

As described above with reference to FIG. 3, classifiers and traffic conditioner modules are typically implemented on a per-port basis at each port where traffic control is desired. In accordance with an embodiment of the invention, a classification control module is also implemented on a per-port basis at each port where the classifier and traffic conditioner module are implemented. In a multiport network node and/or in a multinode network, multiple instances of the traffic control architecture are implemented in parallel. FIG. 6 depicts an example of a traffic control architecture 614 that includes multiple DiffServ instances 648 that are implemented in parallel. The multiple DiffServ instances can be implemented at different ports within the same network node and at different network nodes within a communications network. In the embodiment of FIG. 6, each DiffServ instance of the traffic control architecture includes a classifier 616, a traffic conditioner module 618, and a dedicated port-specific classification control module 626.

Figure 7:
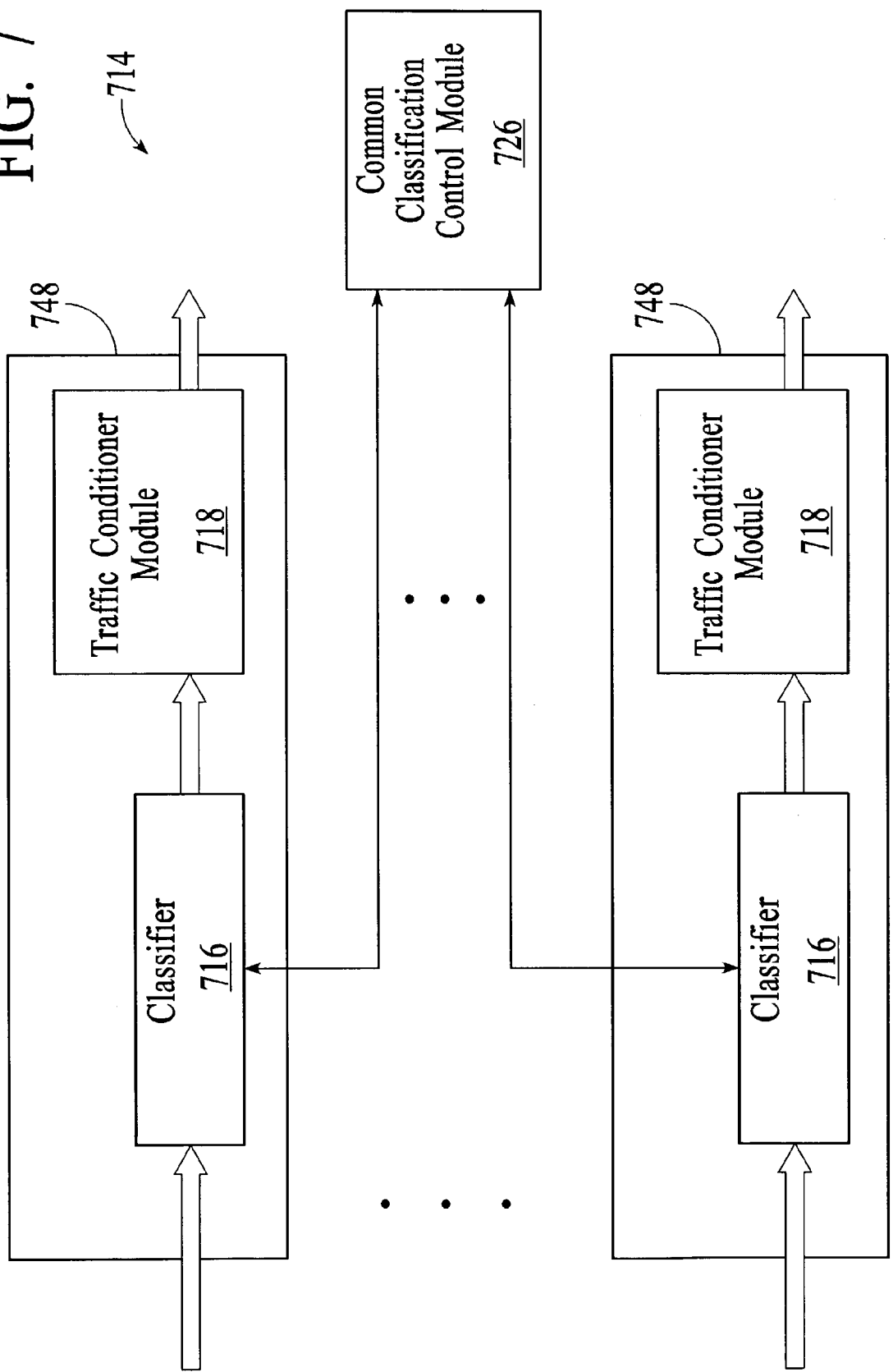
FIG. 7 is a logical depiction of an embodiment of a traffic control architecture that utilizes a common classification control to serve multiple DiffServ instances in accordance with an embodiment of the invention.

In an alternative embodiment, classifiers and traffic conditioner modules are implemented on a per-port basis while one classification control module that is common to multiple port-specific DiffServ instances is implemented. FIG. 7 is a logical depiction of an embodiment of a traffic control architecture 714 that utilizes a common classification control module 726 to serve multiple DiffServ instances 748. In the embodiment of FIG. 7, the common classification control module collects and processes traffic data from multiple port-specific classifiers 716, sets classification rules for the port-specific classifiers in response to the processed traffic data, and distributes the classification rules to the port-specific classifiers. In an embodiment that utilizes a common classification control approach, the classifier and traffic conditioner module 718 for each port may be located in local network nodes where traffic classification is desired and the common classification control module may be located in a remote network node that supports the classification control functionality for multiple ports and multiple network nodes. In an embodiment that utilizes a common classification control approach, traffic classification rules can be set on a per-port basis and/or on a multiple port basis (that is, the same classification rules can be set for multiple port-specific classifiers).

Figure 8:
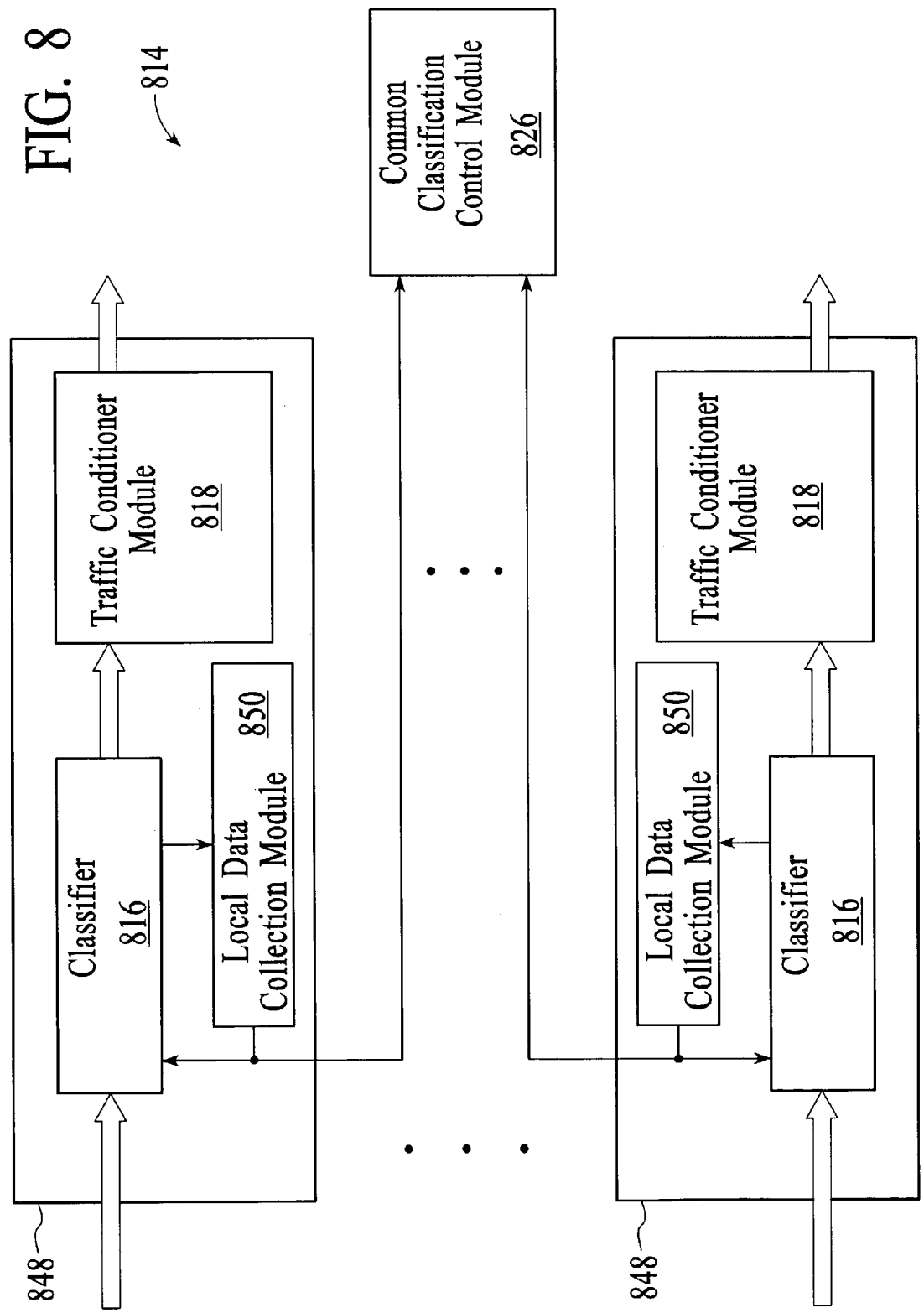
FIG. 8 depicts another embodiment of a traffic control architecture that utilizes local data collection modules and a common classification control module to serve multiple DiffServ instances in accordance with an embodiment of the invention.

FIG. 8 depicts another embodiment of a traffic control architecture that utilizes a common classification control module 826 to serve multiple DiffServ instances 848. In the embodiment of FIG. 8, data collection is performed local to each port-specific classifier 816 while the processing of traffic data and the setting of classification rules is performed remotely by the common classification control module. As depicted in FIG. 8, each DiffServ instance includes a local data collection module 850 that collects port-specific traffic data and provides the port-specific traffic data to the common classification control module. In an embodiment, the common classification control module also includes a data collection module, as depicted in FIG. 4, which collects the port-specific traffic data from the local data collection modules. The common classification control module may process the port-specific traffic data on a port-specific basis so that port-specific classification rules can be established and/or the common classification control module may combine the port-specific traffic data of multiple ports for processing. The processing of port-specific traffic from multiple ports may be used to establish classification rules that can be applied across multiple ports.

Figure 1:
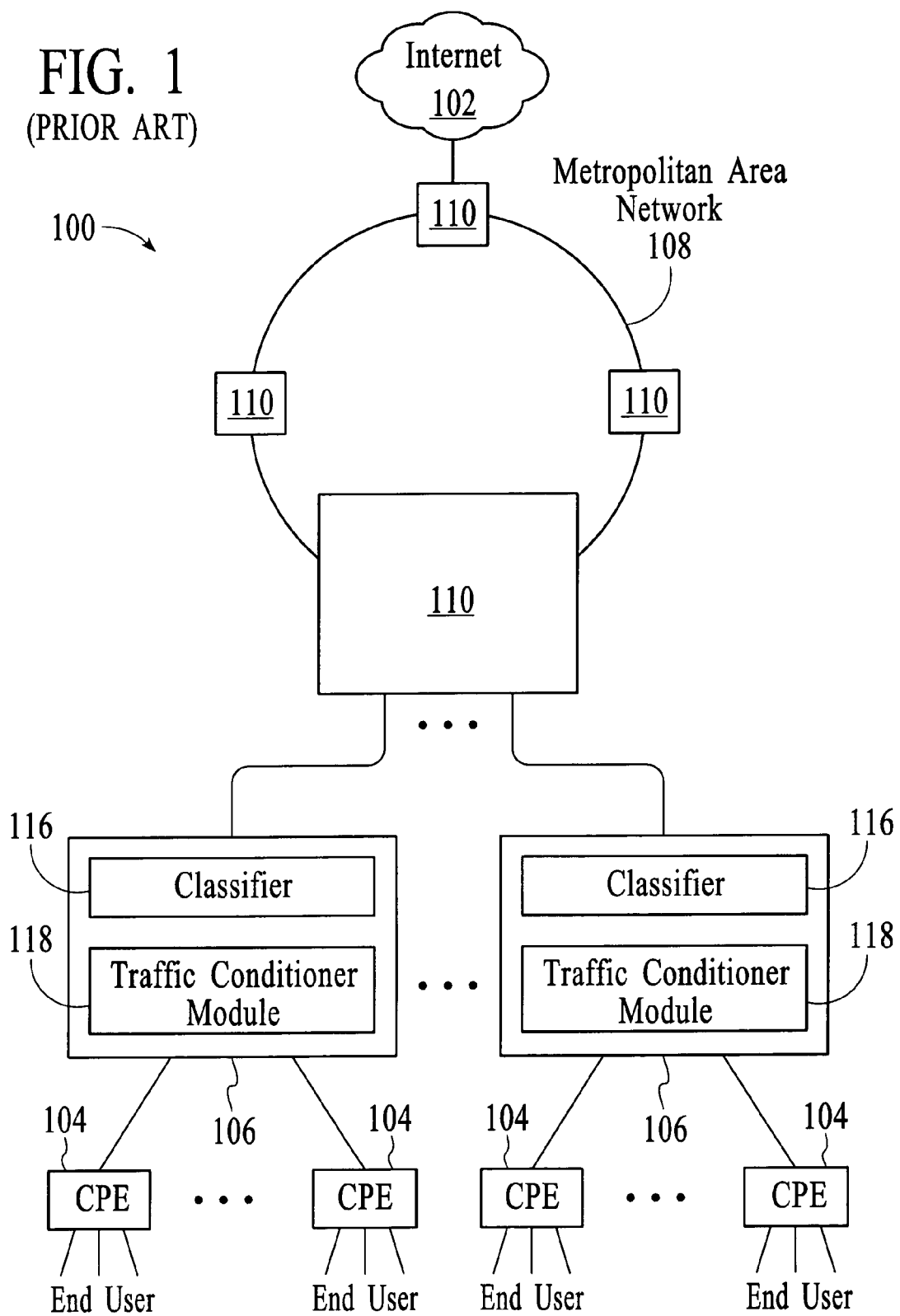
FIG. 1 depicts an example of a known subscriber-based network architecture in which end-users are connected to the Internet through a combination of customer premises equipment (CPE), intermediate network nodes, and a metropolitan area network (MAN).
Figure 9:
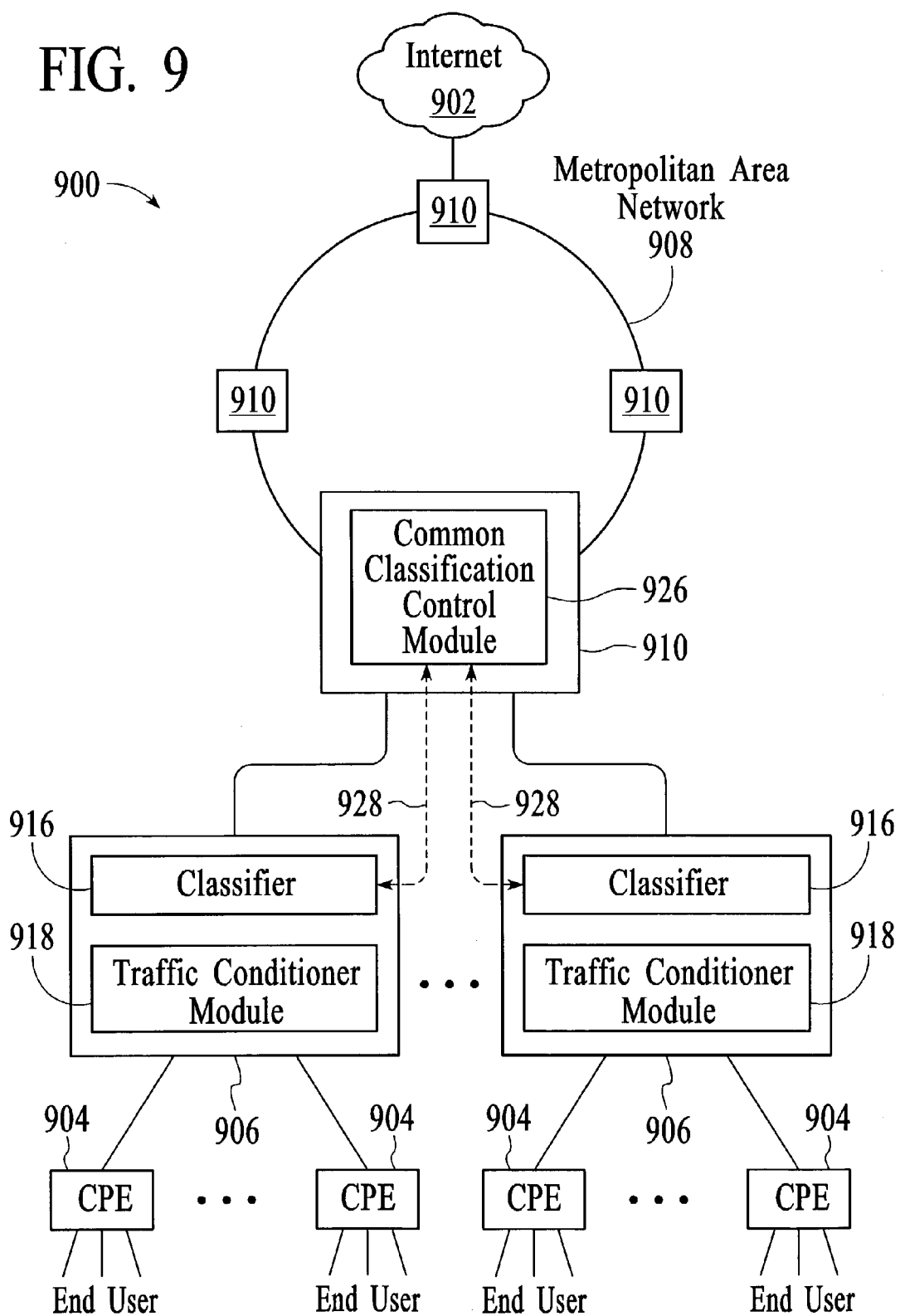
FIG. 9 depicts an example of a traffic control architecture that is applied to a large scale network, such as a subscriber-based access network that includes DiffServ instances at multiple network nodes and a common classification control module at a different network node that serves the multiple DiffServ instances in accordance with an embodiment of the invention.

Traffic control architectures that utilize the common classification control approach, as described with reference to FIGS. 7 and 8, can be applied to large scale networks such as the subscriber-based access networks described with reference to FIG. 1. FIG. 9 depicts an example of a traffic control architecture that is applied to a large-scale network 900, such as a subscriber-based access network. The traffic control architecture includes DiffServ instances (classifiers 916 and traffic conditioner modules 918) at multiple network nodes and a common classification control module 926 at a different network node that serves the multiple DiffServ instances. In the embodiment of FIG. 9, the DiffServ instances are located within the intermediate network nodes 906 (also referred to as local network nodes) that are located between the end-user CPE 904 and the metropolitan area network (MAN) 908. The common classification control module is located within the service provider edge device 910 (also referred to as the remote network node), which is a node in the MAN. Although the traffic control architecture is depicted within the subscriber-based network in a particular arrangement, it should be understood that other arrangements of the classifiers, traffic conditioner modules, and common classification control module are contemplated. In an embodiment, classifiers and traffic conditioner modules are installed on a per-port basis at the intermediate network nodes.

In an example operation of the traffic control architecture described with reference to FIG. 9, port-specific traffic data is collected for each DiffServ instance as indicated by logical communications path 928. The port-specific traffic data can be collected remotely at the common classification control module 926 as described with reference to FIG. 7, locally at each DiffServ instance as described with reference to FIG. 8, or any combination thereof. Once the port-specific traffic data is collected at the common classification control module, the traffic data may be processed as described above with reference to FIG. 5. After processing at the common classification control module, the traffic data is used to establish classification rules. The classification rules may be port-specific classification rules, classification rules that apply to multiple port-specific classifiers, or any combination thereof. After the classification rules are established, they are distributed from the common classification control module to the port-specific classifiers 916 via logical communications path 928. The newly set classification rules are then used by the classifiers to classify subsequent network traffic. Because the control of the classifiers is accomplished from a centralized location, the task of adapting a large number of classifiers (i.e., from thousands to tens of thousands) to current traffic conditions is easier to manage. For example, the algorithms used to process traffic data and set classification rules can be managed from a single location. In an embodiment, the adapted classification rules can be used to achieve more effective traffic conditioning.

Figure 10:
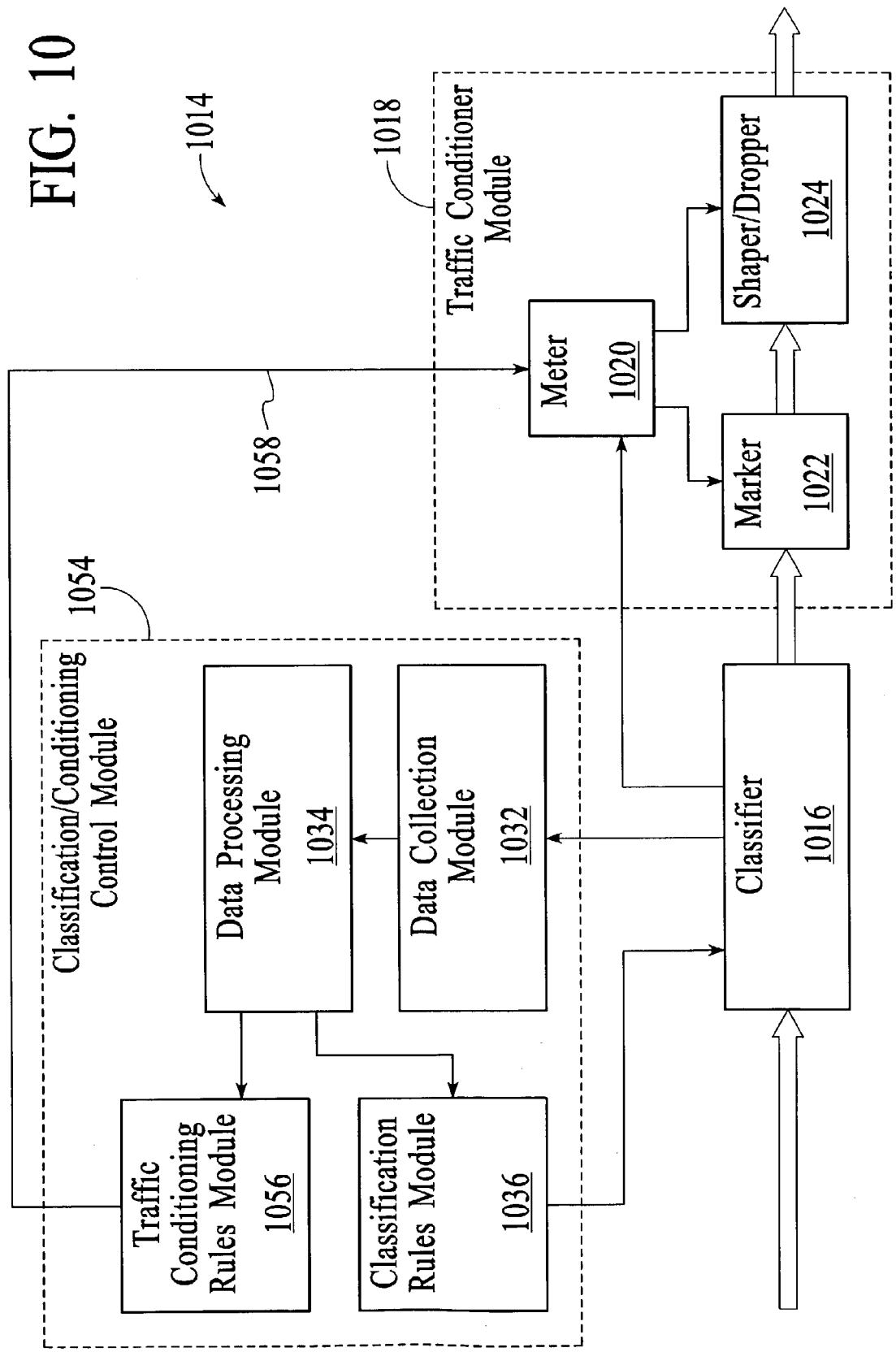
FIG. 10 depicts a traffic control architecture that includes a classifier, a traffic conditioner module, and a classification/conditioning control module in which the classifier and the traffic conditioner module are adapted in response to the classification/conditioning control module in accordance with an embodiment of the invention.

As described with reference to FIGS. 3 and 4, traffic data is collected and processed so that classification rules can be set and adapted in response to current traffic conditions. In addition to classification rules, traffic conditioning rules can be set and adapted in response to current traffic conditions. That is, the data that is collected and processed for setting traffic classification rules can also be collected and processed for setting traffic conditioning rules. FIG. 10 depicts a traffic control architecture 1014 that includes a classifier 1016, a traffic conditioner module 1018, and a classification/conditioning control module 1054 in which the classifier and the traffic conditioner module are adapted in response to the classification/conditioning control module. Specifically, the classification/conditioning control module establishes traffic classification and conditioning rules in response to collected and processed traffic data. In the embodiment of FIG. 10, the classification/conditioning control module is similar to the classification control module 426 that is described with reference to FIG. 4 except that the classification/conditioning control module includes an additional object, a traffic conditioning rules module 1056. The traffic conditioning rules module sets traffic conditioning rules in response to traffic data that is provided by the data processing module. In operation, the traffic conditioning rules module establishes traffic conditioning rules and provides the rules to the traffic conditioner module as indicated by communications path 1058. Example traffic conditioning rules may include rate limiting via token buckets, changing the DiffServ codepoint (i.e., from 2 to 3), and changing the traffic from a high priority queue to a medium priority queue. The combination of the traffic conditioning rules module and the classification rules module enables a DiffServ instance to be adapted to identify particular applications in a traffic stream and then control the particular applications with application-specific conditioning rules. The traffic control architecture described with reference to FIG. 10 can also be applied to the common classification control approach that is described with reference to FIGS. 7-9.

In the embodiment of FIG. 10, the traffic conditioning rules are provided to the traffic conditioner module 1018 through the meter 1020. In an embodiment, the meter monitors the traffic classes to which the rules apply and then applies the traffic conditioning rules. Application of the traffic conditioning rules may cause packets to be marked, shaped, and/or dropped. Traffic conditioning rules may be adapted in response to new traffic data from the data processing module.

Figure 11:
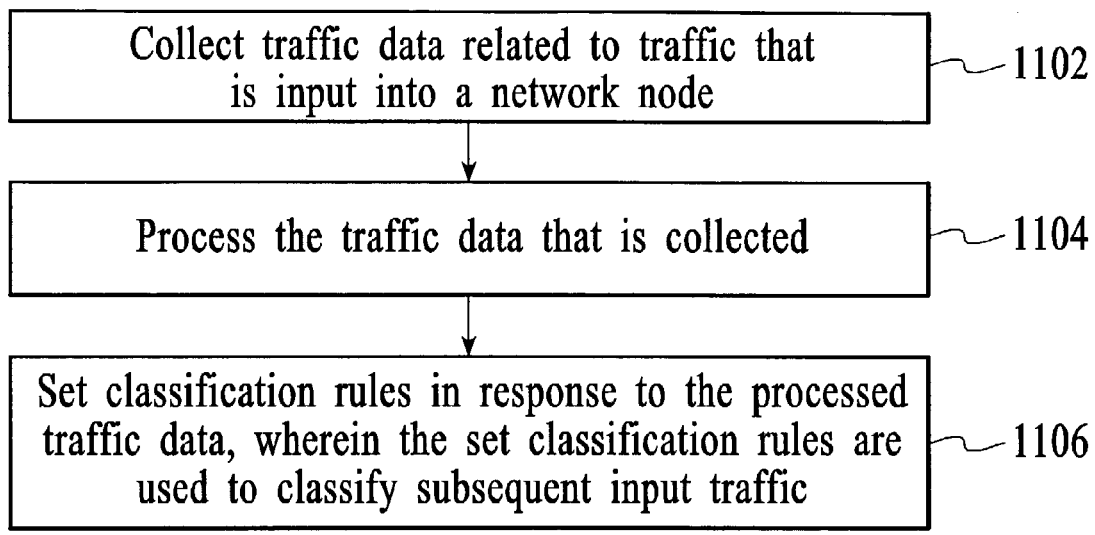
FIG. 11 depicts a process flow diagram of a method for setting classification rules for classifying traffic in a communications network in accordance with an embodiment of the invention.

FIG. 11 depicts a process flow diagram of a method for setting classification rules for classifying traffic in a communications network. At block 1102, traffic data related to traffic that is input into a network node is collected. At block 1104, the traffic data that is collected is processed. At block 1106, classification rules are set in response to the processed traffic data, wherein the set classification rules are used to classify subsequent input traffic.

Figure 12:
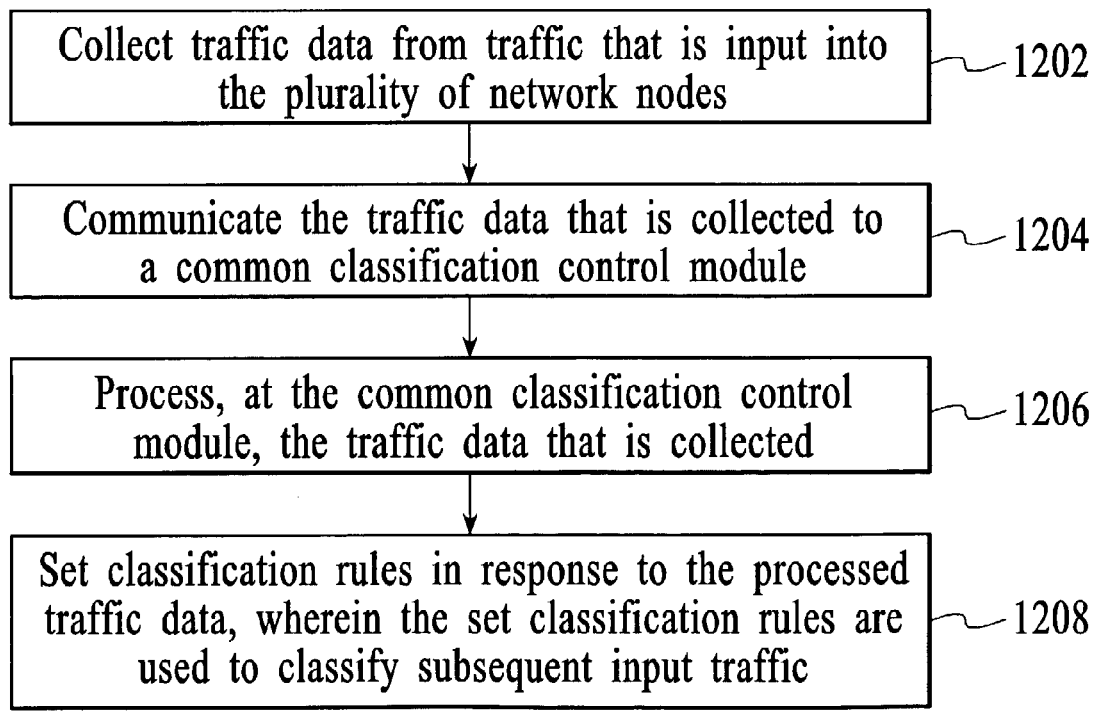
FIG. 12 depicts a process flow diagram of a method for setting classification rules for a plurality of classifiers that are distributed among a plurality of network nodes in a communications network in accordance with an embodiment of the invention.

FIG. 12 depicts a process flow diagram of a method for setting classification rules for a plurality of classifiers that are distributed among a plurality of network nodes in a communications network. At block 1202, traffic data from traffic that is input into the plurality of network nodes is collected. At block 1204, the traffic data that is collected is communicated to a common classification control module. At block 1206, the traffic data that is collected is processed at the common classification control module. At block 1208, classification rules are set in response to the processed traffic data, wherein the set classification rules are used to classify subsequent input traffic.

Although specific embodiments of the invention have been described and illustrated, the invention is not to be limited to the specific forms or arrangements of parts as described and illustrated herein. The invention is limited only by the claims.

What is claimed is:

1. A system for controlling the flow of traffic in a communications network comprising:
   a metropolitan area network (MAN) having an edge device;
   multiple customer premises equipment (CPE) devices for use in a subscriber-based network;
   multiple intermediate network nodes that are located between the edge device and the CPE devices, each intermediate network node including a classifier that is configured to classify traffic according to received classification rules and a traffic conditioner module that is configured to condition the flow of classified traffic;
   said edge device receives traffic from said MAN and transmits said traffic to said CPE devices via said intermediate network nodes;
   a common classification control module, located at the edge device, configured to;
      collect traffic data from traffic that is input into said intermediate network nodes and destined for said CPE devices;
      process said traffic data that is collected;
      set classification rules in response to said processed traffic data, wherein said set classification rules are used to classify subsequent traffic;
      set traffic conditioning rules in response to said processed traffic data wherein said set traffic conditioning rules are used to condition subsequent traffic;
      distribute said classification rules to said classifiers at said intermediate network nodes; and
      distribute said traffic conditioning rules to said traffic conditioning modules at said intermediate network nodes.

2. The system of claim 1 further including local data collection modules, associated with said classifiers, that collect port-specific traffic data and provide said collected port-specific traffic data to said common classification control module.

3. The system of claim 1 wherein said common classification control module includes a data enhancement module for enhancing said traffic data.

4. The system of claim 1 wherein said common classification control module includes a data transformation module that transforms said traffic data.

5. The system of claim 1 wherein said common classification control module includes a data aggregation module that aggregates said traffic data.

6. The system of claim 1 wherein said common classification control module includes a trend identification module that identifies trends in said traffic data.

7. The system of claim 1 further including multiple port-specific traffic conditioner modules.

8. The system of claim 7 further including a traffic conditioning rules module that sets traffic conditioning rules in response to said processed traffic data.

* * * * *